United States Patent [19]

Bagley

[11] Patent Number: 5,286,323
[45] Date of Patent: Feb. 15, 1994

[54] DOME SHAPED EXTRUSION DIES
[75] Inventor: Rodney D. Bagley, Big Flats, N.Y.
[73] Assignee: Corning Incorporated, Corning, N.Y.
[21] Appl. No.: 21,257
[22] Filed: Feb. 23, 1993
[51] Int. Cl.$^5$ ............................................. B29C 47/12
[52] U.S. Cl. ............................................. 156/89; 264/60;
264/62; 264/119; 264/82; 264/177.11;
264/177.12; 264/211.11; 419/26; 419/38;
419/44; 425/380; 425/461; 425/463; 425/464;
425/467
[58] Field of Search .................... 264/177.12, 177.11,
264/211.11, 60, 120, 119, 62, 82, 295; 156/89;
425/461, 463, 464, 467, 380, 197; 419/26, 38, 44

[56] References Cited
U.S. PATENT DOCUMENTS

| 323,680 | 8/1885 | Holden . | |
|---|---|---|---|
| 1,980,234 | 11/1934 | Taylor | 425/464 |
| 2,891,277 | 6/1959 | Sutor | 425/464 |
| 2,923,969 | 2/1960 | Thorpe | 425/464 |
| 3,516,478 | 6/1970 | Dunn et al. | 425/197 |
| 3,803,951 | 4/1974 | Bagley . | |
| 3,837,783 | 9/1974 | Bagley . | |
| 3,863,001 | 1/1975 | Thumudo . | |
| 3,903,341 | 9/1975 | Gerhold | 156/89 |
| 4,168,944 | 9/1979 | Morikawa et al. | 425/464 |
| 4,293,513 | 10/1981 | Langley et al. | 264/60 |
| 4,574,459 | 3/1986 | Peters . | |
| 4,687,433 | 8/1987 | Ozaki et al. . | |
| 4,788,023 | 11/1988 | Bühler et al. | 264/120 |
| 4,814,187 | 3/1989 | Inoue et al. | 425/464 |
| 5,066,215 | 11/1991 | Peters et al. . | |
| 5,122,317 | 6/1992 | Chen et al. | 264/60 |
| 5,171,503 | 12/1992 | Peters et al. | 264/177.11 |

FOREIGN PATENT DOCUMENTS

| 0293269 | 11/1988 | European Pat. Off. . | |
|---|---|---|---|
| 0336750 | 10/1989 | European Pat. Off. . | |
| 3622695 | 1/1988 | Fed. Rep. of Germany | 425/461 |
| 53-26857 | 3/1978 | Japan | 425/380 |
| 62-236710 | 10/1987 | Japan | 425/461 |

Primary Examiner—Jeffery Thurlow
Attorney, Agent, or Firm—Angela N. Nwaneri

[57] ABSTRACT

An dome-shaped extrusion die for use in forming honeycomb monolith structures is disclosed. The die is formed by deforming an extrusion die having a flat cross section to obtain a dome-shaped cross section. Alternatively, the die may be fabricated from sinterable ceramic or metal powders in which case the holes and slots may be formed either in the green state, or in a chalk-hard state after partial densification.

23 Claims, 3 Drawing Sheets

DOME SHAPED EXTRUSION DIES

BACKGROUND OF THE INVENTION

The invention relates to a method of fabricating dome-shaped dies. Typically, dies for cellular extrusions are formed from solid steel blocks by drilling feed holes in the entrance portion of the die and cutting slots in the exit portion of the die such that the holes generally intersect the slots. Dies can also be made by stacking plates which have the appropriate feed holes and slots so that they generally intersect when stacked.

Monolithic dies for extruding cellular structures are usually made using straight round feed holes which communicate from the inlet side of the die to the slots in the outlet face of the die. This is because straight round feed holes are often easier and least expensive to make. However, straight round holes can lead to problems since shoulders are formed where the holes intersect with the slots. In addition to the problem of high wear, this creates high back pressure during extrusion. There are other problems associated with the traditional method of forming dies. For example, for very thin-walled cellular extrusions which require thin slots, dies made by the above methods have proved both difficult and expensive due to the extra processing steps often required to produce useful dies. For example, it has been suggested to coat the slots in certain dies to achieve the desired wall thickness.

To avoid the sometimes abrupt changes in cross-sectional area of the feed holes at their junctions with the discharge slots, it has been suggested in co-assigned U.S. Pat. No. 5,066,215 issued to Peters et al., to form feed holes having a gradual transition of flow cross-sectional area and shape commencing at the entrance portion or end of the feed hole and terminating at the exit portion or end of the feed holes, where longitudinal and lateral flow through discharge slots commences. In the reference die, the cross-sectional area at any location along the length of any feed hole is less than at any location upstream thereof. While the suggested die eliminates the high bending forces on the die and also substantially reduces abrasive wear, it is relatively expensive to manufacture since each hole and slot combination must be cut individually.

To reduce the costs associated with such dies, in co-pending, co-assigned patent application (U.S. Ser. No. 08/021,487), I have disclosed a relatively inexpensive and easy method of making geometrically complex dies having ultra-thin slots for extruding very thin-walled cellular structures. While the method described therein reduces the cost of making such dies, there continues to be the need for easier and inexpensive methods for fabricating complex-shaped structures such as thin-walled cellular or honeycomb structures which will not deform or break under pressure.

Accordingly, it is the object of the present invention to provide a die for making complex thin-walled cellular structures which die will not deform or break under pressure, and a method of producing such die.

SUMMARY OF THE INVENTION

Briefly, the present invention provides an extrusion die having a concave outlet end face. In one embodiment, the inlet end face of the die is convex in shape. In one particularly useful aspect, the invention provides a dome-shaped extrusion die having a curved or circular cross-section, an inlet portion, an outlet portion, and a junction between the inlet portion and the outlet portion, the outlet portion having a plurality of feed holes longitudinally extending from an inlet face of said inlet portion, and the outlet portion having a plurality of intersecting and laterally criss-crossing discharge slots extending from the junction to an opposite outlet face on the outlet portion.

According to one aspect of the invention, the die is formed by combining sinterable powders to form a sinterable batch which is shaped and machined, preferably in the green state, into a die preform having a flat cross section. Then, either before or after sintering, the preform is reformed into a dome-shaped structure having a curved or circular cross-section.

In another aspect, the green body is first partially machined, followed by partial densification to form a chalk-hard body which is then further machined, reformed, and sintered to form the extrusion die.

In still another aspect, controlled curvature of the die is obtained by using layers of powders having different shrinkages, such that the low shrinkage material is formed on the inlet side of the die.

In a further aspect, the controlled curvature of the die is obtained by subjecting the inlet side of an alumina die preform to a reducing agent prior to sintering to cause vapor state grain growth on the inlet side of the die.

In still a further aspect, the curved cross-section of the die is obtained by first sintering and densifying the inlet side of the preform prior to sintering the outlet side of the die preform.

In yet another aspect, the die is formed by applying pressure to the outlet face of a flat formed metal die while contraining the die around the perimeter.

In a further aspect, the curved cross-section of the die is obtained by heating a flat metal die to its softening temperature, and then controllably distorting or reforming the die to obtain a curved cross-section.

In this specification:

"pre-form" refers to the formed powder prior to sintering or complete densification;

"chalk hard state" refers to the partially fired state achieved when the preform is fired to a temperature where sintering densification is just beginning. In this state, the preform is strong enough to hold hole-forming pins, and soft enough to be easily machined;

"honeycomb extrusion die" refers to a die having an outlet face provided with a gridwork of interconnected discharge slots and an inlet face provided with a plurality of feed holes or openings extending partially through the die in communication with the discharge slots; and "contra die" refers to a monolithic die having feed holes having a gradual or continuous transition of flow cross-sectional area and shape commencing at the entrance portion or end of the feed hole and terminating at the exit portion or end of the feed holes, where longitudinal and lateral flow through discharge slots commences.

BRIEF DESCRIPTION OF THE DRAWINGS

FIG. 8, is a schematic representation of shrinkage curves for fine and coarse powders.

DETAILED DESCRIPTION OF THE INVENTION

Figure 1A:
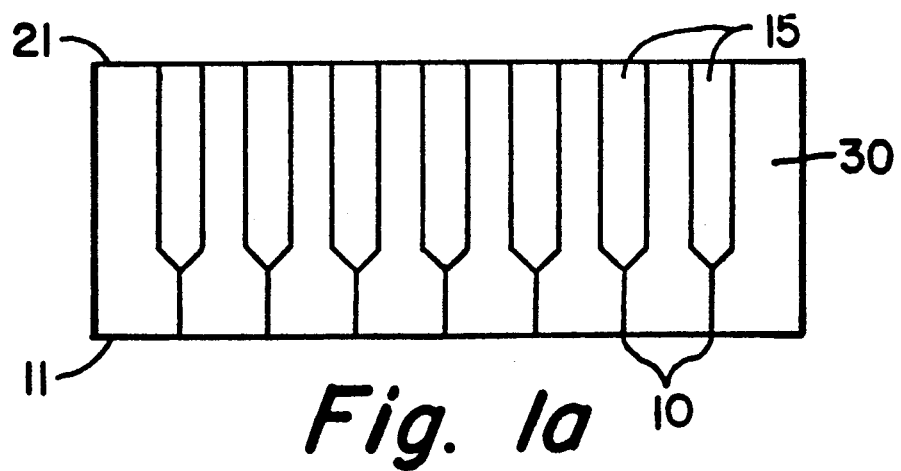
FIGS. 1a and 1b are schematic diagrams showing the formation of a dome-shaped die (1b), having a curved cross-section from a flat die form (1a).
Figure 1B:
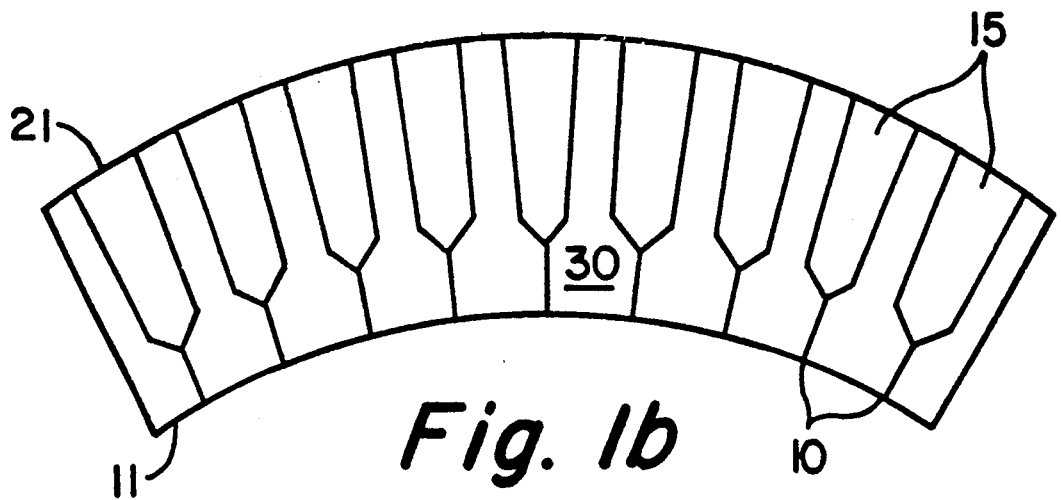
Figure 2:
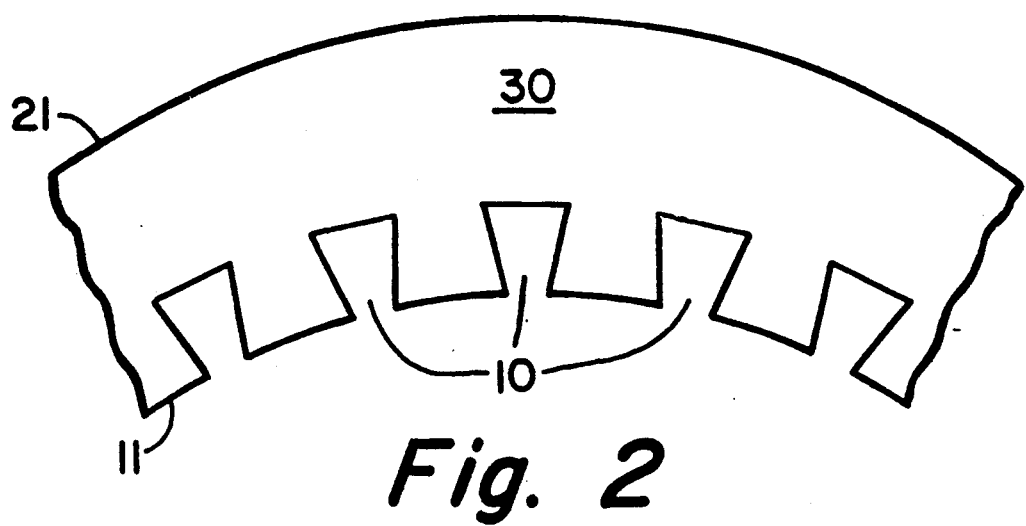
FIG. 2 is a diagram illustrating the tapered slots of the dome-shaped die.

Referring now to the drawings, the curved cross-section of the dome shaped die of the invention is obtained by deforming or reforming a flat-formed preform as shown in FIGS. 1a and 1b. Due to the curvature of the die, the slots are tapered, narrowing toward the exit end as shown in FIG. 2. This tapering of the slots, has the effect of reducing the width of the slots and leads to the production of even thinner walled honeycomb structures than those formed using the contra die. The tapered slots also result in more lateral flow through the die and better slot filling as the batch moves through the die. The slots can also be shallower than those found in conventional dies, making the pins of the present die shorter and therefore, more stable.

Because the centerline of the slots in a dome-shaped die generally project toward a focal point, as the batch flows through the slots, it is squeezed together to form a better bond or knit. In addition, the dome-shaped die of the invention is therefore more rigid and more resistant to isostatic load than a flat die, and is more able to withstand high extrusion pressures. Using the methods of the invention, thin dies can be made resulting in less extrusion back pressure and faster extrusion rates for a given pressure. Also, using the present method, dies having larger frontal areas can be formed.

The preforms can be made by dry pressing a powder, usually with the addition of a small amount of binder. Alternatively, the pre-form can be made by the addition of a large amount of binder and plasticizers to metal or ceramic powders to form a batch which can be plastically molded into a die shape, for instance by injection molding. After the pre-form is molded, it is then machined to form a series of longitudinally spaced, recess channels or feed holes and slots which are so arranged to produce a honeycomb-forming die. Preforming of the green body can be done by any suitable powder forming method such as dry or wet processing, isostatic pressing, slip casting, extrusion, injection molding, doctor blading etc. For very dense products, the hot isostatic pressing is preferred.

The holes can be made to any shape by inserting shaped pins into the green preform. To form "contra" feed holes as disclosed in co-assigned U.S. Pat. No. 5,066,215, the holes can be formed by cutting or drilling holes in either the green or chalk hard preform. Because the pre-form is relatively soft, the holes can be cut using a diamond wire saw.

Dies having tapered holes, slots or both, can also be made by varying the density or packing of the powder particles in different parts of the preform. The density of the preform can be varied for example, by pressing various parts of the preform with different pressures. Alternatively, the powder can be extruded or tape cast into layers which can then be stacked and pressed together to bond them into a monolithic structure before machining. For water-based preforms, the layers can be bonded by pressing the layers together. For thermoplastic preforms, the layers can be bonded by heating sufficiently to bond the layers through melting. The amount of shrinkage of each layer can be controlled by using powders of different shrinkages and by varying the amount of binder.

Figure 3:
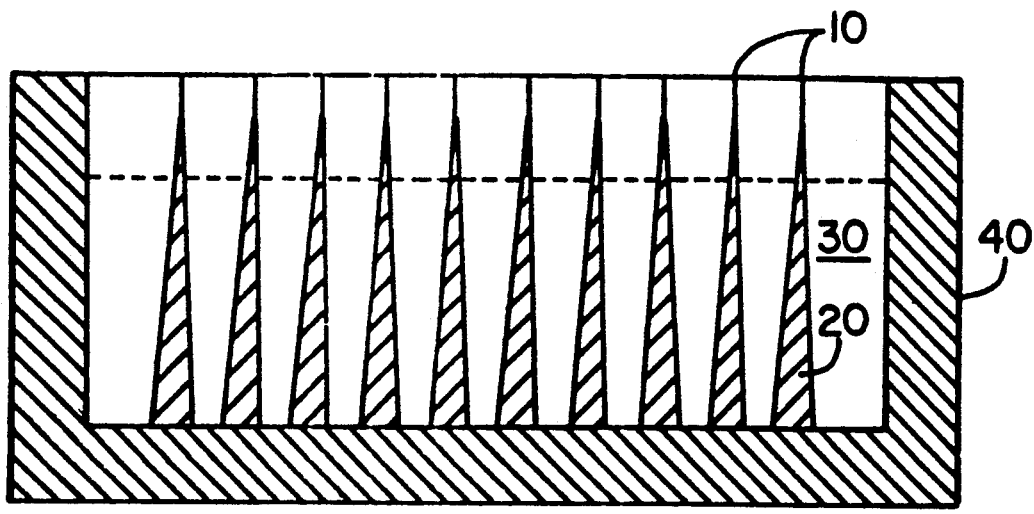
FIG. 3, is a cross-sectional view of the preform showing the core pins and slots.

Alternatively, the holes can be formed by molding the powder or die material 30 in a mold 40 over a negative pattern of the feed holes formed by core or shaped pins 20, or by forming around such pins as shown in FIG. 3. The core pins 20 can be made of metal, wax, plastic, ceramic, or other material which have sufficient rigidity to withstand the molding pressure without distortion. The pin material will also depend on the nature and type of the batch material, that is, whether it is ceramic or metal, and also on the amount of binder used to form the batch. After the mold is formed over the core pins 20, the core pins 20 can be removed simply by pulling them out of the formed green batch or preform. For ease of removal, it may be desirable to apply lubricants to the pins prior to the molding process. The core pins 20 can also be coated with a material which will burn off to leave a slight gap between the pins and the pre-form so that the pins can be readily removed.

In addition to the above methods, the core pins can be constructed of heated material having a higher thermal expansion coefficient than the pre-form so that upon cooling, the pins will shrink away from the preform leaving a gap and making it easier to pull the pins away from the preform.

Figure 4:
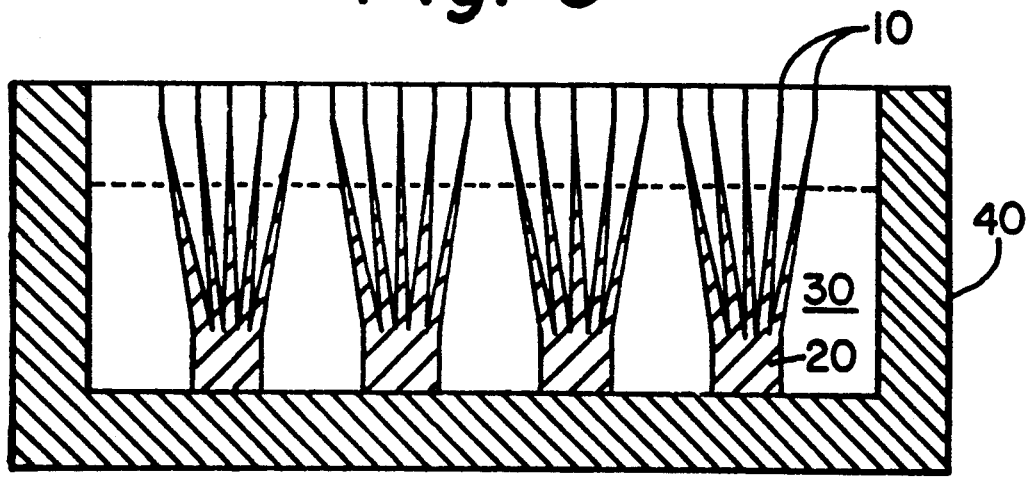
FIG. 4, is a cross-sectional view of the preform showing complex shaped core pins and slots.

For complex feed hole shapes such as shown in FIG. 4, the core pins 20 can be made of material which would melt on heating. Such meltable core pins can be made from metals or alloys with low melting point, high melting wax and/or plastics, or mixtures of metals, alloys, plastics and/or waxes, provided that the meltable pins remain rigid during the molding or forming process to prevent distortion of the pins. After the molded preform has sufficiently gelled or hardened, the assembly can then be heated to a high enough temperature to melt the pins (but not the die material), thus leaving the feed holes. Using this method, extrusion dies having complex geometrically shaped and designed feed holes can be formed. Since the meltable pins of this embodiment are not pulled out, but rather, are melted within the preform, dies having very complex geometrically shaped feed holes can be obtained. The core pins can also be formed from material which can be dissolved or burned off. Appropriate pin material will depend on such variables as the complexity of the feed hole geometry, the batch composition etc. Alternatively, non-round or other complex feed holes can be formed by programming and feeding a wire saw (e.g., a diamond saw) through a pilot hole. After the feed holes 15 are formed, slots 10 can be cut to connect or communicate with the feed holes.

For some die designs such as the contra die, the feed holes 15 and the slots 10 can be formed at the same time. Since the slotted part of the die is typically more prone to distortion during binder burnout and/or sintering than the feed hole portion, if there is a tendency for the slots to warp, the slotting operation can be done after the preform has been fully densified or sintered. For electrically conductive materials which can be slotted using electrical discharge machining (EDM) or electrochemical machining (ECM) wire saws, the holes can be formed in the green or chalk-hard state, and after sintering to a fully densified state, the slots can be formed using either the EDM or ECM techniques. Slotting by these methods is relatively easy even in the dense or sintered state because unlike the conventional slot cutting method which depends on abrasion, EDM and ECM methods depend on spark erosion and chemical dissolution.

Additives such as zirconia and high strength fibers can be added to the alumina body for provide added toughness to the body after sintering.

Desirable powders for fabricating the die of the invention must have sufficient strength after sintering, to withstand the pressures normally encountered by dies during extrusion, generally in the range of 2000 to 3000 psi (2.84 to 4.27 kg/m$^2$). In particular, suitable powder materials must not distort (i.e., slump or sag) during firing.

Powders which sinter and densify by solid state diffusion rather than liquid or glass phase sintering, are preferred. Unlike solid state sintering, in liquid state sintering, a liquid phase is present, and sintering occurs as a result of viscous flow and/or solution and dissolution of the material, which may cause the entire body to undergo viscous movement. This is particularly true of glass powders. In addition, liquid may collect at the grain boundaries as is the case with cobalt-bonded tungsten carbide. In solid state sintering, material movement is caused by the movement of atoms or ions through the crystalline lattice. Unlike materials which sinter by liquid state mechanism, materials which sinter in the solid state are stable and not easily warped, sagged or slumped. As a result, solid state sintered materials are preferred for the die of the invention as they tend to sinter uniformly about the cross section of the die so that slot widths and lengths can be better controlled.

Figure 5:
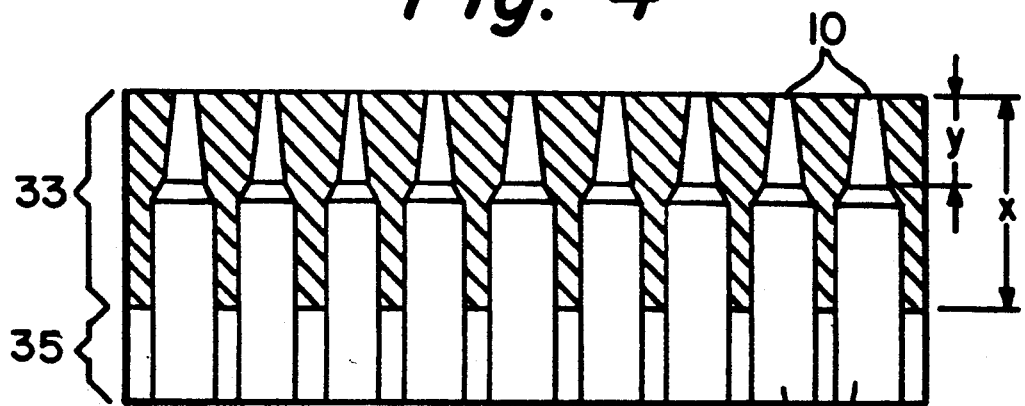
FIG. 5, is a diagram showing layers of powders having different shrinkages for forming the tapered slots of FIG. 3b.

The powders may be metal or ceramic, preferably ceramic such as powders of alumina, zirconia, and their precursors and other wear resistant compositions such as borides and carbides. In a particularly useful embodiment, FIG. 5, the die is formed using layers of powders having different shrinkages such that a low shrinkage layer 33 is formed on the inlet side 11 of the die. In this embodiment, the thickness (x) of the layer of low shrinkage material is greater than the depth (y) of the slots 10. The differential shrinkage between the low shrinkage 33 and the high shrinkage layer 35, the rate of shrinkage at various temperatures, the thickness (x) of the low shrinkage layer, and the planar size of the die will determine the amount of curvature or bow which will be produced. The low shrinkage layer 33 must only be in the inlet or entrance side 11 of the die where the die is essentially continuous in a plane perpendicular to the extrusion direction. Upon sintering, the differential shrinkage between the inlet part of the die and the rest of the die will result in controlled curvature.

Even though the die is made from powders which shrink by solid state diffusion, the die can be distorted by imposing a force on the die. The distortion begins at relatively low temperatures with respect to the final sintering temperature. For instance, distortion can begin at as low as 1200 to 1300 C. in alumina before the part is fully sintered. The weight of an unsupported die is often enough to cause sagging. Therefore, the dome-shaped die can be formed by allowing a formed green preform to deform under its own weight. While this method can be used to form dome-shaped ceramic dies, it is not the preferred method for ceramic batches because grain boundary cracking may occur due to the high temperatures generally needed to sinter. If the die is deformed at low temperatures, then grain boundary cracking may not be a problem. At high temperatures, pin distortions may also occur. To prevent pin distortion, the pins may be protected or shielded during the reforming stage.

In one particularly useful embodiment, the die is made by forming feed holes and slots in green or chalk hard powder pre-forms having a flat cross section. The preforms are then reformed or reshaped to form a dome-shaped die having a curved cross section, which is then sintered.

I have found that alumina powders which have been doped with magnesium are useful for fabricating the dies of the invention. MgO is known to control grain size and prevent growth of exaggerated grains which tend to reduce the strength of alumina during sintering. In one useful embodiment, dies were formed using sinterable alumina particles which have been doped with MgO to control grain size and prevent exaggerated grain growth, using the following composition:

| | |
|---|---|
| *A-16 Alumina (Alcoa) | 2841.08 g |
| MgO (Mallincrodt AR) | 3.01 |
| XUS 40303.00 Binder (Dow Chemical) | 98.02 |
| Carbowax 400 | 58.81 |
| Darvan C | 14.80 |
| Deionized water | 3693.00 |

*A-16 alumina is an alpha alumina which is readily available, is relatively inexpensive, has a relatively large shrinkage (18-19%), and can be sintered to high densities.

After spray drying, the batch was isostatically pressed into a block in a rectangular rubber mold at 20,000 psi (28.4 kg/m$^2$). Smaller blocks (preform) were cut from this block using a diamond saw or a band saw. The preforms were soft fired in air at about 1050° C. with a two hour holding period, after which the samples were soft enough to be readily drilled or slotted, but strong enough to be easily handled and machined. In the soft-fired (chalk-hard) state, holes were drilled into one face of the preform using a diamond tipped tungsten carbide twist drill, 0.052 in (0.132 cm) in diameter. Drilling was done at a speed of 1400 rpm with an impulse motion using water as the flushing medium. Slots, 0.015" (0.038 cm) deep and 0.075" (0.19 cm) long were then cut to intersect every other hole using a semiconductor slicing saw 0.006" (0.01524 cm) thick and 6" (15.24 cm) diameter, using distilled water as a flushing medium. Saw speed was 2875 rpm and the motion of the saw axis with respect to the preform was 2 inches/min (5.08 cm/min). To form the dome-shaped die, the flat machined pre-form is deformed to form a curved cross-section by the methods of the invention. The dome-shaped preform can then be dried and/or sintered for example, it can be fired in hydrogen for 2 hours at 1650° C. The dome shape can be formed either before or after drying the preform.

Generally, the higher the density of the powder, the less the shrinkage, therefore, the density of the powder is dictated by the amount of shrinkage desired. Gamma alumina particles are inherently less dense than alpha particles which also have a different crystal structure from gamma particles. Depending on the desired shrinkage levels, the die of the invention can be fabricated from gamma particles which, when sintered, will change to alpha particles. For less shrinkage, the die can be made from a mixture of gamma and alpha particles, while alpha particles can be used for the least amount of shrinkage.

With respect to particle size, the level of packing depends on the particle size, as coarse powders tend to pack better than fine particles. Like density, the particle sizes can also be mixed to control packing. Shrinkage can also be controlled by the amount of binder in the batch, that is, the powder to binder ratio. The lower the ratio, that is, the more the binder, the more the pre-form will shrink. For injection molding operations it may be necessary to use more binder. For other applications requiring less binder usage, shrinkage may be controlled by varying the particle size and density. Some powders do not require binders and can be pre-formed or consolidated into a die shape by pressure alone.

Given the right combination of powders, additives and sintering atmosphere, powder pre-forms tend to shrink to near their theoretical density during sintering, so that slots cut into the pre-forms will become narrower during sintering. Therefore, dies having narrow slots can be obtained using the method of the invention since linear shrinkages in pre-forms are typically in the range of 10-25% or higher. I have found that ultra-thin slots can be formed by selecting certain powder particles. For example, crystals of gamma alumina are light and fluffy, finer and less dense than alpha alumina crystals. Even at high pressing pressures, gamma alumina particles pack to form light (i.e., low density) parts. Thus, when bodies are made from gamma alumina, shrinkage occurs from both crystal transformation (gamma to alpha), and from the low green density.

The density of gamma particles is about 3.6 g/cm$^3$. Upon sintering at about 1050° C. or higher, gamma particle convert irreversibly, to alpha particles which are inherently denser, having a density of about 4 g/cm$^3$, resulting in shrinkage. In addition, gamma particles, as well as some other precursor aluminas, typically have very fine particle sizes with surface areas of over 200 m$^2$/g. When the particles are used to make a pre-form, they produce a low density preform since they do not pack to a high density. However, upon sintering, the gamma particles- or alumina precursor-derived pre-forms can sinter to near theoretical density and produce linear shrinkages sometimes in excess of 30%. Thus, a 3.5 mil (0.0089 cm) slot die can be achieved by cutting a 5 mil (0.0127 cm) slot in a preform. This results in a significant advantage in the die manufacturing process as it eliminates the need for very fine saw blades which tend to be fragile and less rigid.

Dome-shaped dies having tapered holes, slots or both, can be made by varying the density or packing of the powder particles in different parts of the preform. The density of the preform can be varied for example, by pressing various parts of the preform with different pressures. Alternatively, the powder can be extruded or tape cast into layers which can then be stacked and pressed together to bond them into a monolithic structure before machining. For water-based preforms, the layers can be bonded by pressing the layers together. For thermoplastic preforms, the layers can be bonded by heating sufficiently to bond the layers through heating. The amount of shrinkage of each layer can be controlled by using powders of different shrinkages and by varying the amount of binder.

In addition to the above methods, other techniques can be used to obtain a die having a curved cross-section. For example, the inlet side of an alumina die can be subjected to a reducing agent such as aluminum metal vapors, or carbon containing vapors which cause vapor state grain growth and sintering to occur. Vapor state sintering causes grain growth with minimal shrinkage. Thus, the material containing or exposed to reducing vapors (e.g., hydrogen and argon vapors) will initially shrink less than the rest of the body. This will cause curvature. These vapors can be formed by adding a vapor producing precursor material to the powder layer on the inlet side of the die. Precursor materials could be aluminum metal powders or carbon containing powders which would persist through part of the firing cycle. For example, the preform can be fired with the inlet face exposed to, or containing, aluminum or carbon atmosphere until the required curvature is obtained. Then the curved preform may be fired in an oxidizing atmosphere to remove the aluminum or carbon. Finally, the preform may be fired to a high density in a vacuum or diffusable gas to achieve a fully densified structure. Because the added aluminum or carbon causes grain growth in the alumina, the sintering rate can vary from that of powders made with without aluminum or carbon. As a result, additional curvature can occur even after the aluminum or carbon have burned out and the body is densified further. This additional curvature must be accounted for in achieving a desired curvature.

In one embodiment, the outlet side of the die is heated more rapidly than the inlet side so that sintering occurs at the outlet side first to produce a curved structure due to differential shrinkage between the hot and cold faces of the planar die. This distortion occurs below the temperature at which the material becomes fully sintered. If the outlet side is sintered to a relatively dense state, it will no longer deform readily, (i.e., the curvature will be "locked in"), and the rest of the body can be heated to a high temperature while still retaining most of the initial curvature.

In another embodiment, the inlet portion of the die is doped with a sintering promoter such as titania which will make the inlet side sinter, shrink and densify first. Then the rest of the die can be densified while retaining the curvature of the die.

Binders useful for the manufacture of products from powdered starting materials, e.g., from particulate ceramic materials, must meet a number of requirements. For example, the binder must be compatible with the ceramic material such that a flowable dispersion comprising a relatively high loading of the ceramic material in the binder may be provided. In addition, the "green" preform produced by shaping the dispersion of ceramic powder in the binder should have reasonable strength such that it can be handled. Residual carbon, that is carbon remaining after the removal of binders, particularly in ceramic material, is generally deemed to be detrimental to the development of desirable ceramic microstructure. It is therefore important that all of the organic constituents of the binder have excellent burn-out properties, such that there will be minimal or no potential for forming carbon during the binder removal process. The binder should also be removable from the shaped ceramic part without incurring distortion or breakage of the part. And, the binder-free preform should have at least a minimum level of strength, yet be sufficiently free of binder residues that defect-free consolidation is readily achievable. Useful binders are preferably organic, even though certain inorganic binders can be used as well.

Examples of useful binders include methylcellulose, polyvinyl alcohol, water soluble glue and polyethylene glycol. Depending on the powders and forming mechanism, lubricants such as stearates (e.g., zinc and aluminum stearate), and oils may be used in addition to the binder. In other applications, the binder can also function as a lubricant.

In one embodiment, high powder loadings are achieved by using a thermoplastic organic binder which comprises essentially of a wax component, serving as a solvent or matrix phase in the binder, and an organic polymer serving as a gel-forming species in the binder. These components are chemically and physically compatible, forming a homogeneous wax/polymer melt wherein the polymer is dissolved or dispersed in the molten wax. However, upon cooling from the melt, reversible gel linkages are formed between the extended polymer chains in the liquid wax such that the binder exhibits the behavior of a cross-linked gel.

In one particularly useful embodiment, the sinterable powder is first combined with a powder dispersant and a solvent for the dispersant to provide a powder slurry. In a separate container and separate mixing step, the thermoplastic polymer is combined with a selected low-melting wax component at a temperature above the melting temperature of the wax, in order to provide a wax/polymer mixture (binder) comprising a uniform solution or dispersion of the polymer in the molten wax. The powder slurry is next combined with the wax/polymer mixture and the combination is mixed together at a temperature above the melting temperature of the wax. Mixing is continued for a time at least sufficient to provide a homogeneous dispersion of the powder in the binder mixture, and to evaporate as much of the solvent component as possible, from the slurry to form a paste. By incorporating the powder component as a slurry rather than as a dry mill addition, higher loadings of the powder in the binder can be achieved.

Completion of the mixing process through solvent removal typically produces a thermoplastic paste exhibiting good fluidity or plasticity for molding or other forming process when heated, and sufficient strength when cooled, to allow for easy handling of the preform provided therefrom. In one preferred embodiment, the binder formulation consists essentially, in weight percent, of about 30–80% of at least one low-melting volatile wax, e.g., a fatty alcohol wax, 1–40% of at least one high molecular weight organic polymer, 0–20% total of modifying waxes, such as Carnauba wax, and 0–15% total of dispersants, lubricants, release agents and other functional additives having known utility in ceramic batches for molding or extrusion.

Certain alumina powders can be fabricated with little or no binder because these powders pick up moisture from the air due to their small particle sizes. For such powders, it may be necessary to add a small amount of binder (preferably, less than 5%), to act as lubricant and to give the pre-form some strength for ease of machinability if the preform is to be machined in the green state. If the preform is to be machined in the chalk-hard state, then it may not be necessary to add a binder.

If the preform contains sufficient binders and plasticizers, it can be machined with high speed steel or tungsten carbide saws and drills. Also, since the preform is soft, slotting can be done more easily than in metals, especially using saws in the 4–6 mil (0.0102–0.01524 cm) range. Feed holes can also be readily drilled with standard twist drills in batches having high binder content.

Tungsten carbide saws and drills can also be used to machine preforms having low binder content. For soft fired ceramic preforms, diamond tooling may be used.

In one embodiment, dies having ultra-thin and tapered slots are made by using layers of powders having different shrinkages as described in co-pending U.S. Ser. No. 08/021,487. The thin slots of the dome-shaped die is achieved by reforming or reshaping a flat preform into a dome shape having a curved cross-section. By re-shaping the preform as shown in FIGS. 1a and 1b, the slots become tapered, getting narrower at the exit face of the die as illustrated in FIG. 2. Using this method, it is also possible to obtain thin slots by reforming a flat formed preform made entirely from material.

The greater the curvature of the die, the more the taper in the slots. Enough curvature is required to prevent the die from distorting under load. Since one advantage of a curved die is that a thinner die can be used, less extrusion pressure will be needed, or faster extrusion speeds can be obtained at the same pressure. Since the curvature of the die is concave on the pin side (i.e., the outlet side) of the die, for ease of machining, desirably, the pins should be formed before curving the die.

Figure 6:
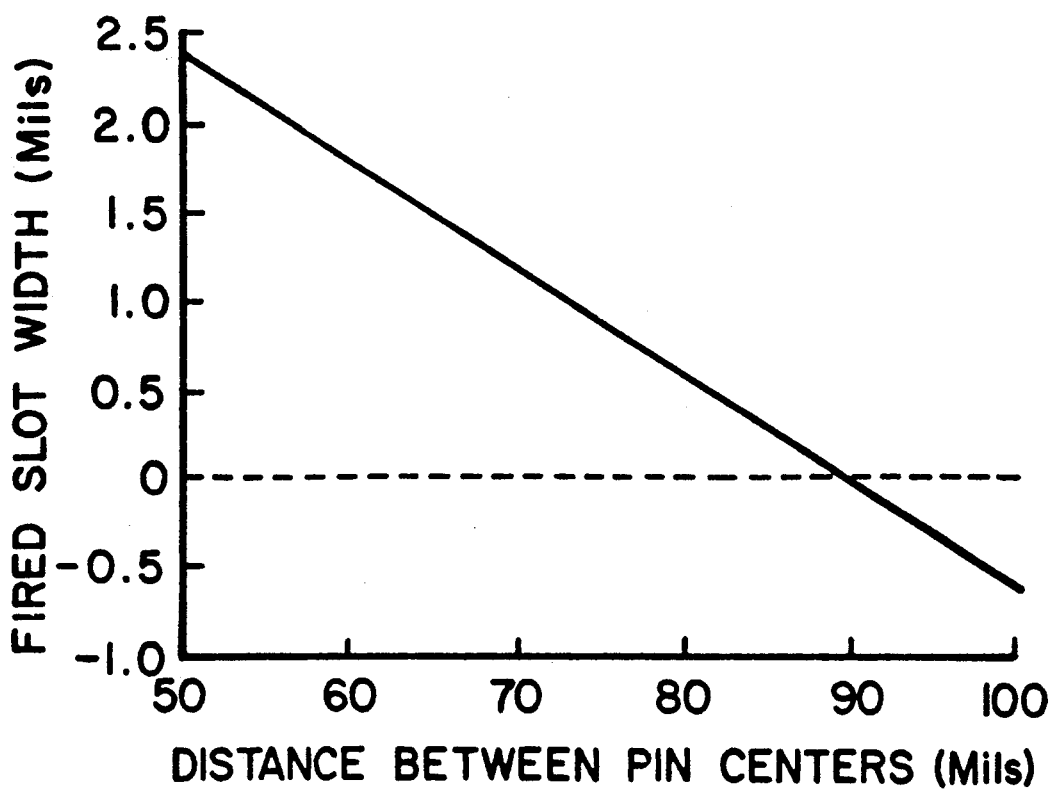
FIG. 6, is a diagram illustrating the technique for determining the final slot width of a totally densified or sintered die.
Figure 7:
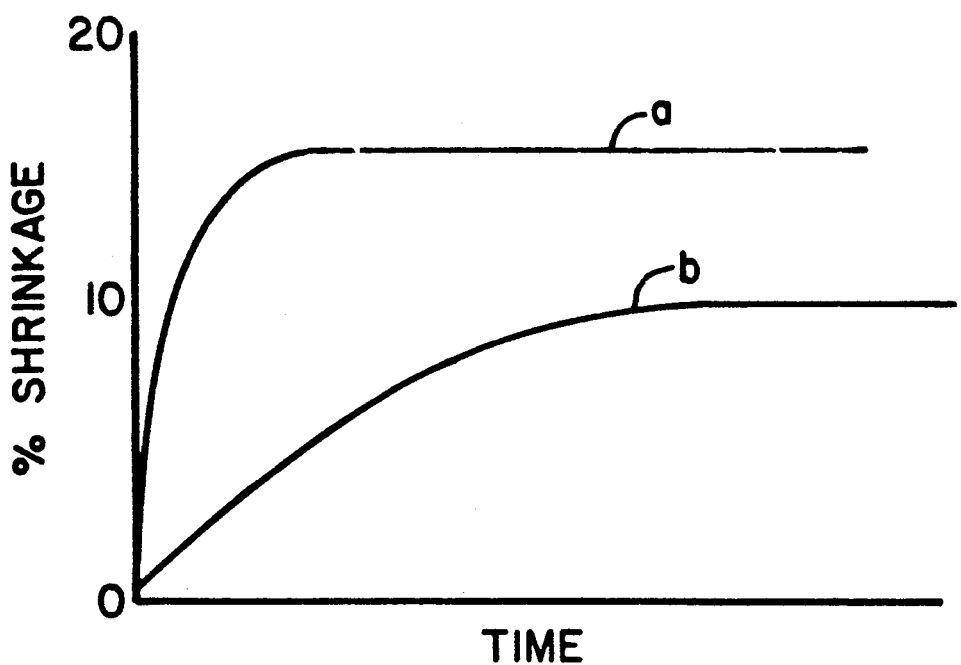
FIG. 7, is an illustrative graph showing how fired slot width varies with distance between pin centers for given initial slot width and material shrinkages.

In some instances, for example, when the die is made with both fine and coarse powders, slot closure may occur. The point at which slot closure will occur for various slot widths and die pin center spacing can be predicted by FIG. 6. One reason for slot closure is that typically, fine powders tend to shrink and densify more rapidly than coarse powders. This is illustrated by FIG. 7 which is a schematic representation of shrinkage curves for fine and coarse powders (lines (a) and (b) respectively), having firing shrinkages of about 15 and 10% respectively. As the fine powder approaches its maximum shrinkage and density, the coarse powder has shrunk only about 5% (i.e., about 50% of its maximum shrinkage). If the initial slot is not wide enough, slot closure can occur at this time, and some sintering together of the slot walls can occur. As further sintering of the coarse powder occurs, some of the slot walls which are the least sintered together can pull apart, leaving a die with some slots which are sintered closed and some which are wider than expected. This type of slot closure can be prevented by employing several techniques. For example, the coarse, low shrinkage powder can be doped with a shrinkage promoter such as $TiO_2$ to promote initial shrinkage of the coarse material.

To prevent slot closure, portions of the preform, preferably in the chalk-hard state, may be doped with a shrinkage promoter such as $TiO_2$ to promote initial shrinkage in the doped region. Alternatively, a portion of the preform, preferably, the slot region, may be dipped in an alumina-containing solution such as Chlorohydral (a water-based solution which can contain up to 23–24% alumina, available from Reheis Chemical Co.), to a depth less than the pin depth. The alumina can he applied in multiple dips with decomposition firinqs between each dip. When the preform is machined and fired, the area impregnated with the Chlorohydral would shrink less than the rest of the body, but should shrink at about the same rate or faster than the rest of the body. The amount of shrinkage for a particular powder can vary depending on the binder and sintering aids used, the pressing pressure, the firing time, temperature, firing atmosphere etc.

To demonstrate the differential shrinkage method for making ultra-thin or narrow slots, batches were prepared using two different powders. The first was an alpha alumina having firing shrinkage of about 12–13% during sintering. The second was also an alpha alumina, but having differential shrinkage of 18–19%. Layered samples were prepared by first placing a smooth 3 g layer of the first batch in a 1-in plunger type die and pressing to 7800 psi (11.1 kg/m$^2$). A 13.4 g layer of second batch was then placed in the die and consolidated at 7800 psi (11.1 kg/m$^2$). This laminated preform was then placed in a thin walled rubber bag and pressed at 30,000 psi (42.67 kg/m$^2$) in an isostatic press. The samples were then fired for 2 hours at a temperature of 1050°–1250° C. to burn out the binder and provide soft-fired (chalk-hard) samples (or slugs) for slotting and/or hole forming.

Using a 100 grit diamond wheel, the samples (slugs) were machined on a surface grinder to form blocks of preform measuring about 0.6"×0.6" (1.524×1.524 cm) by about 0.5" (1.27 cm) high. The side dimensions were calculated to produce even sized pins over the entire top, so the exact dimensions varied slightly with each cell density. A 6 mil (0.01524 cm) diamond saw was used for slitting. Slots 100 mils (0.254 cm) deep were made in two directions to produce pins. Three dies (A, B and C) with slot centerlines of 50, 75, and 100 mils (0.127, 0.19, and 0.254 cm respectively), corresponding to cell densities in the machined state of 400, 178, and 100 cpsi (62, 27.6, and 15.5 cells/cm$^2$) respectively were made using the above ceramic batch. The slots were uniformly spaced over the surface so that pin sizes were all equal. After slitting (slotting), the dies were then fired in a hydrogen furnace at a rate (ramp) of about 75° C./hour to 1650° C., held at 1650° C. for 2 hours, and cooled at the normal furnace cooling rate. After sintering, the cell density as measured by the number of cells/in2 of the dies increased from the pre-sintering density due to shrinkage. To form the dome-shaped die, after slotting and after forming the holes, the pre-form can be reformed into a dome shape as described above and then sintered.

Dies fabricated from metals can be bent by applying pressure on the die while appropriately constraining the die around the perimeter. For ease of machining, bending would typically be done after the machining is done. For instance, the die could be placed in an extruder with the direction of flow to the die reversed so that the slotted side of the die is now on the inlet side. Using a stiff batch, pressure can be applied to distort the die. If the metal die is made from a hardenable alloy or metal, the distortion would be done before hardening the die.

In another embodiment, the metal die is heated to a high temperature and then reshaped or reformed. Since the pins can be easily deformed, a means of applying uniform pressure on the slotted side of the die must be used such as a stiff glass or other fluid. Alternatively, the die can be formed by allowing the preform to sag under its own weight until a desired curvature is obtained.

In addition to the above methods, flat metal dies may be reshaped into a dome shape by using the expansion force of water to bend the die. This can be accomplished by placing the flat metal die in a large holding tank with the slot side facing up. The tank is then filled with water and chilled. As the water freezes, it applies pressure on the die, causing the die to deform. The desired shape and curvature of the die can be controlled by any practical means. For example, the bottom of the tank can be partially cut out to the desired shape and curvature of the die. The die is then made to rest on this opening to seal the tank. As the water freezes and applies pressure on the die, the die will bulge through the opening to form a dome shaped die. The die may also be explosively deformed in a similar holding tank by directing an explosive force to the outlet (slotted) end of the die.

To form a honeycomb structure using the present die, an extrudable batch material is fed to the die under pressure so that the extrudable material flows longitudinally through the feed holes in the inlet face of the die and is thereby directed to the interconnected, laterally criss-crossing discharge slots communicating with the outlet face, wherein a portion of the material flows laterally within the slots to form a continuous mass before being discharged longitudinally from the outlet face to form a thin-walled honeycomb structure having a plurality of cells or open passages extending therethrough.

It should be understood that this invention is not to be unduly limited to the illustrative embodiments set forth herein. Thus, any method of reshaping a die may be used provided the chosen method does not distort the pins. In addition, the curvature can be in one or more directions depending on the desired shape.

I claim:

1. A dome-shaped extrusion die having an inlet portion, an outlet portion, and a junction between the inlet portion and the outlet portion, the inlet portion having a plurality of feed holes longitudinally extending from a convex inlet face of said inlet portion, the outlet portion having a plurality of intersecting and laterally criss-crossing discharge slots extending from the junction to an opposite concave outlet face on the outlet portion, said die having a curved cross-section.

2. The die of claim 1, wherein the slots are tapered, narrowing from the junction to the opposite outlet face of the outlet portion.

3. A method of forming a dome-shaped extrusion die from powders, comprising the steps of: compounding sinterable powders to form a mixture; shaping the mixture to form a preform; machining the preform by forming a plurality of longitudinally spaced feed holes and having a plurality of intersecting and laterally criss-crossing discharge slots in the body such that the slots are in communication with the feed holes; reforming the preform to obtain a curved cross section; and sintering the preform to form a dome-shaped die.

4. The method of claim 3, wherein the sinterable powders are selected from metals and ceramics.

5. The method of claim 4, wherein the sinterable powders comprise alumina, zirconia, and precursors of these oxides.

6. The method of claim 5, wherein the mixture is formed by:
pre-milling the powders with a dispersant and a solvent to coat the powders with the dispersant;
dissolving or dispersing a high molecular weight thermoplastic polymer in a wax component at a temperature above the melting temperature of the wax to form a molten wax/polymer binder;
adding the milled powders to the molten binder at a temperature sufficient to blend the powder and molten binder; and
volatilizing the solvent to produce a thermoplastic slurry or paste.

7. The method of claim 3, wherein following the formation of the feed holes, the green body is partially densified to a chalk-hard state prior to formation of the discharge slots.

8. The method of claim 3, wherein the curved cross section is obtained by contacting a portion of the preform with a sinter-controlling material prior to sintering.

9. The method of claim 8, wherein the sinter-controlling material comprises titania-doped alumina.

10. The method of claim 9, wherein the titania-doped alumina is applied to the portion of the preform containing the discharge slots.

11. The method of claim 8, wherein the sinter-controlling material comprises vapor species crystal growth enhancer.

12. The method of claim 11, wherein the vapor-species crystal growth enhancer is applied to the portion of the preform containing the feed holes.

13. The method of claim 11, wherein the growth enhancer is selected from aluminum and carbon-containing gas.

14. A method of forming a dome-shaped extrusion die from powders, comprising the steps of:
compounding low shrinkage sinterable powders to form a first material;
compounding high shrinkage sinterable powders to from a second material;
forming a first layer with the first material, and forming thereon a second layer with the second material to form a green laminated preform;
machining the green preform to form a plurality of feed holes longitudinally extending from the surface of the first layer into said second layer, and a plurality of intersecting and laterally criss-crossing discharge slots extending from the opposite surface of the second layer into the second material such that the slots communicate with the feed holes; and
sintering the preform to obtain the dome-shaped die.

15. The method of claim 14, wherein the sinterable powders comprise metals and ceramics.

16. The method of claim 14, wherein following the formation of the feed holes, the green preform is partially densified to a chalk hard state prior to formation of the discharge slots.

17. Method of forming an extrusion die having a curved or dome-shaped cross-section, comprising:
providing a green preform having a flat cross-section, an inlet portion, an outlet portion, and a junction between the inlet portion and the outlet portion, the inlet portion having a plurality of feed holes longitudinally extending from an inlet face of said inlet portion, the outlet portion having a plurality of intersecting and laterally criss-crossing discharge slots longitudinally extending from the junction to an opposite outlet face on the outlet portion;
densifying the green preform to a chalk-hard state;
reforming or reshaping the preform to form a dome-shaped structure having a curved cross section; and
sintering the structure to form a dome-shaped die.

18. The method of claim 17, wherein the unsintered preform is reformed or reshaped by placing the preform in an extrusion press with the outlet portion toward the inside of the press, and applying sufficient pressure to the preform to obtain a curved cross-section.

19. A method of making a honeycomb structure using the extrusion die of claim 1.

20. A method of forming a dome-shaped extrusion die from powders, comprising the steps of:
compounding sinterable powders to form a mixture;
machining the mixture to obtain a preform having an inlet portion, an outlet portion, and a junction between the inlet portion and the outlet portion, the inlet portion having a plurality of feed holes longitudinally extending from an inlet face of said inlet portion, the outlet portion having a plurality of intersecting and laterally criss-crossing discharge slots extending from the junction to an opposite outlet face on the outlet portion; and
sintering the preform to obtain a dome-shaped extrusion die.

21. The method of claim 20, wherein the sintering is achieved by heating the outlet portion more rapidly than the inlet portion of the preform.

22. The method of claim 20, wherein the outlet portion of the preform is contacted with titania-doped alumina prior to sintering.

23. A method of making a honeycomb structure using the dome-shaped extrusion die of claim 20 by feeding an extrudable batch material to the die under pressure so that the extrudable material flows longitudinally through the feed holes to the discharge slots and through the outlet face to form a thin-walled honeycomb structure having a plurality of cells or open passages extending therethrough.

* * * * *

UNITED STATES PATENT AND TRADEMARK OFFICE
CERTIFICATE OF CORRECTION

PATENT NO. : 5,286,323
DATED : February 15, 1994
INVENTOR(S) : Rodney D. Bagley

It is certified that error appears in the above-indentified patent and that said Letters Patent is hereby corrected as shown below:

Col. 3, line 5, "3b" should be "3"

Col. 3, lines 6-13 should read as follows:
"FIG. 6, is an illustrative graph showing how fired slot width varies with distance between pin centers for given initial slot width and material shrinkages; the graph further illustrates a technique for determining the final slot width of a totally densified or sintered die.
FIG. 7, is a schematic representation of shrinkage curves for fine and coarse powders."

Col. 13, line 26, "from" should be --form--

Signed and Sealed this

Eighteenth Day of October, 1994

Attest:

BRUCE LEHMAN

Attesting Officer

Commissioner of Patents and Trademarks